United States Patent [19]
Geula

[11] 3,828,648
[45] Aug. 13, 1974

[54] PLASTIC-LENS CUTTER

[76] Inventor: John H. Geula, 150 E. 69th St., New York, N.Y.

[22] Filed: Jan. 18, 1973

[21] Appl. No.: 324,752

[52] U.S. Cl.............................. 90/13.3, 50/101 LG
[51] Int. Cl............................ B23b 1/18, B24b 7/00
[58] Field of Search................... 90/13.3, 13.6, 13.4; 51/101 LG

[56] References Cited
UNITED STATES PATENTS

| | | | |
|---|---|---|---|
| 2,333,064 | 10/1943 | Williams et al................. | 51/101 LG |
| 2,410,443 | 11/1946 | Hoffer........................... | 51/101 LG |
| 2,747,337 | 5/1956 | Geula............................ | 51/101 LG |

*Primary Examiner*—Gil Weidenfeld

[57] ABSTRACT

A plastic lens cutting device having a rotatable cutter, lens support structure, means to rotate a lens about an axis parallel to the axis of the cutter and a pattern and follower to control the shape of the lens being cut.

19 Claims, 5 Drawing Figures

PATENTED AUG 13 1974 3,828,648

PLASTIC-LENS CUTTER

This invention relates to a novel lens grinding device particularly adapted for the grinding of plastic lenses, for impact resistant spectacles, of the plastic type.

BACKGROUND TO THE INVENTION

Congress has recently passed legislation directed toward the compelling of all spectacles for spectacle wearers to be composed of lenses that are of impact resistant glass or plastic lenses, in order to reduce the high rate of injury to the eyes of spectacle wearers from broken and/or shattered glass lens (s) in assorted accidents. The present inventor, a patentee of former invention(s) in the spectacle lens grinding art, having been intimately in the art for nearly forty years is well familiar with the diverse types of grinding apparatuses together with their advantages and disadvantages from one to the other. Although, for example, there has been previously patented a plastic-lens milling machine in U.S. Pat. No. 2,333,064 patented as early as 1943, the present inventor is well aware of the lack of practical value and usefulness of that particular machine for many reasons, as well as the present inventor being well aware of the fact that to the present date plastic lens (s) are still being ground on conventional glass-lens milling machines.

In particular, the apparatus of the above-noted patent has multiple belts which are subject to wear and particularly to slipping in the presence of plastic dust, as well as the belts being in dangerous positions relative to an operator, the pivotable arm depends solely upon gravity upon a weight for its pressure of the lens against the grinding wheel or cutter and is according subject to bouncing action, and the gearing transmitable of motion to the lens-supporting shaft produces varying torque on the arm against or away-from the cutter, and the cutter teeth thereof are set such that upon striking the lens being cut the pivable arm is further drug into a closed position entirely independent of any weight-balance intended to give a predetermined pressure, and the obviously collecting dust on and about the lens being ground serves to cause cutting imperfections, as well as the plastic dust being subject to dirtying-up various machine parts such that very soon all parts would become substantially inoperative, and for example, the guide form is friction-rubbed against a barrier, as well as the rapidly driven motor of constant speed driving the lens-mounting shaft for multiple revolutions against a speedy cutter which serves to raise or increase the possibility of hot or melting or burning plastic as well as imperfections being introduced. These are merely some of the more apparent problems face in the designing of a plastic-lens cutting machine.

In contrast, the present glass-lens grinding machines employ water streams directed at the point of grinding to wash-away ground glass particles, and plastic dust when plastic lenses are ground thereon, resulting in a messy and dirty grinding procedure, and requiring frequent cleaning of the apparatus, as well as the very important fact that for glass cutting machines it was essential to employ diamond cutting surfaces and because of that as well as the complicated water-washing mechanism such machines have in the past and continue to be in the present extremely costly in purchase price as well as upkeep cost.

SUMMARY OF THE INVENTION

Objects of the present invention include the avoiding and/or overcoming of one or more of the above-noted problems and difficulties.

Another object is to obtain a variable speed cutter,

Another object is to obtain a multi-position cutter.

Another object is to obtain a plastic lens cutter suitable for roughing the lens.

Another object is to obtain a plastic lens cutter suitable for automatically producing a rimless-edge cut-lens.

Another object is to obtain a plastic lens cutter suitable for automatically producing a bevel edge.

Another object is to obtain a plastic lens cutter suitable for obtaining a hide-away bevel edge.

Another object is to obtain a plastic lens cutter suitable to be used as a hand edger.

Another object is to obtain a plastic lens cutter through the use of which regardless of the curve of the lens it remains perpendicular to the rotation of the axis thereof.

Another object is to obtain a plastic lens cutter suitable for a large capacity grinding of many varities of lenses such as from 20m/m to 75m/m, for example.

Another object is to obtain a plastic lens cutter requiring solely a small space, such as typically about 18 by 20 inches, for example.

Another object is to obtain a plastic lens cutter of simple and inexpensive mechanism with minimal possibilities of breakdown and/or major upkeep requirements.

Another object is to obtain a plastic lens cutter having a cutting structure of increased effective life of use.

Another object is to obtain a plastic lens cutter having the cutter driven directly by a motor means, thereby avoiding intermediate motion-transmitting parts such as gears subject to wear, belts subject to wear and/or slippage and/or vibration, which prior difficulties resulted in poor quality.

Another object is to obtain a plastic lens cutter devoid of complicated and/or expensive electronic controls and speed grinding booster(s) and printed circuits and the like, as well as no coating system which requires pumps, pumptank, drain hose, no lubrication, no water, no accumulation of waste, etc.

Other objects become apparent from the preceding and following disclosure.

One or more of the objects of the present invention are obtained by the invention as defined herein.

Broadly the invention includes an apparatus having a fixedly mounted support for a cutting shaft, and in about parallel alignment therewith is a lens-mounting rotatable shaft supported rotatably in a pivoted arm, with vise-securing means for axially withdrawing and advancing the lens-mounting shaft, and with a design-of-lens form-holder at an end of the lens-mounting shaft and a fixedly mounted support and roller surface adjustable toward and away-from the form-holder. In effect, a biasing spring results in a constant pressure of the pivoted arm against the cutter until cut to conform to the guide-form, while the guide form rolls easily without sticking or slipping along a friction surface. In a preferred embodiment, the drive mechanism for the lens-mounting shaft is by way of a driving motion transmitable from or in alignment with the point of pivot of the pivotable arm, such that there is an absence of torque on the arm, as shall be more particularly set forth hereinafter. Similarly as to that of the lens-mounting shaft, also the cutting-element(s) mounting-shaft is vise-clampable of the cutting-element(s) by handle adjustment thereof. In order to mount lenses of varying thicknesses, the opposing vise-clampable axially concentrically aligned shaft — aligned with the above-noted clamping shaft, is axially adjustable to and/or fro. For the elemination of plastic dust, there is a blower directed at the point(s) of cutting and aligned with the directed blown air or gas is a vacuum-suction means of any conventional vacuum type with any desired and/or conventional filter and/or collection vessel for collecting the vacuumed plastic dust blown by the blower. Preferably a transparent shield serves to facilitate the directing of the air stream as well as to protect the eyes of the operator from blown or other dust.

In order to prevent any torque on the pivotable arm, the power for rotating the lens-supporting shaft is preferably transmitted through bevel gears through an intermediate shaft extending between a drive shaft concentric with the axis of pivot of the arm and the lens-supporting shaft. These bevel gears are preferably located in locations relative to one-another such that the direction of rotation of the lens-supporting shaft is in a direction counter to the direction of rotation of the cutter(s) shaft direction of rotation, and such that when mounting or dismounting lens by retracting the vise-shaft, the contacting bevel gear does not preclude the withdrawal but merely withdraws from contact with its meshing bevel gear upon the axial withdrawal of the shaft on which it is mounted. Because the material to be ground is now plastic, as opposed to glass, metallic — preferably stainless steel — cutters are utilizable, as compared to diamond cutting surfaces required by glass-cutting machines for lens milling.

A particularly novel and desirable feature of the present invention is a cutter having multiple separate cutters axially spaced from one-another, preferably being separate cutting elements with male and female axial projections matable with one-another such that they may be either separately singularly mounted or mounted in series with one-another, and also such that when one becomes worn while the others are still in good condition for further use, the sole worn one(s) may be replaced easily.

The invention may be better understood by reference to the following figures, which are not intended to unduly limit the scope of the present invention, but are intended in particular to typically illustrate the invention as well as preferred embodiments thereof.

THE FIGURES

Figure 5:
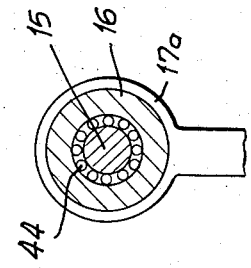
Figure 1:
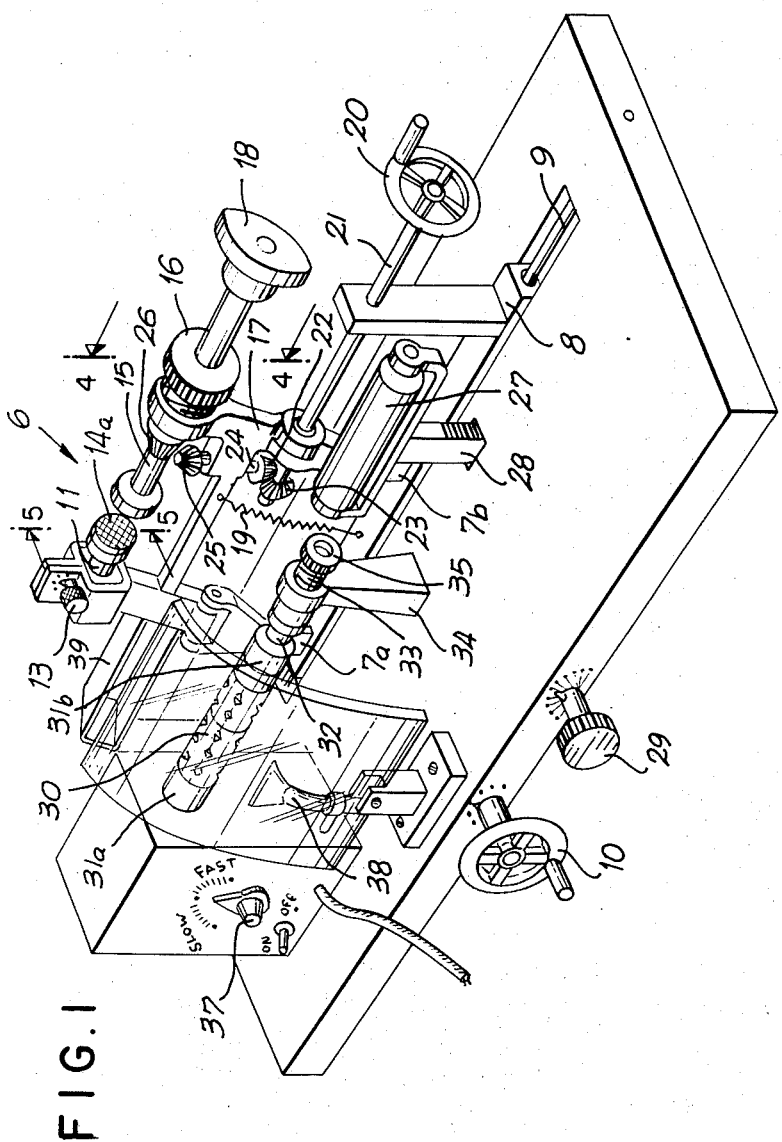
FIG. 1 illustrates in front-side perspective view a typical plastic lens-cutter of this invention, in preferred embodiments thereof.

FIG. 5 similarly illustrates an in-part view in cross-section as taken along lines 5—5 of FIG. 1.

DETAILED DESCRIPTION

In order for the lens-supporting shaft and pivotable arm to be positioned in front of alternatively more than one cutting position, the support structure on which the pivotable arm is mounted, is slidable in about parallel alignment with the axis of the multi-position cutter element.

In particular, the machine 6 includes an arm support 7a and 7b, each on a laterally slidable slide element 8 on a slide rod 9 as variably positionable by the regulating rotary handle 10 which acts by a conventional mechanism of teeth acting on a rasp on the bottom of the slide element 8 in the same manner as illustrated in FIG. 5 for the variable control of the position of shaft 11 by action of teeth 12 of control handle 13, for moving axially to and fro the axis-shaft 11 to accomodate different thickness lenses by rubber faced support structure 14a, relative to support structure 14b of rotaty shaft 15. The shaft 15 is axially movable by the turning of the handle 16 in which the shaft 15 is rotatably mounted. The cylindrical projection fixedly attached to the handle 16 is a threaded male member threadingly receivable within the pivotable arm structure 17 having female threads. Mounted on the end of the shaft 15 is the design-form pattern 18. The arm 17 is in a toggle-switch fashion spring-biased by spring 19 in an illustrated open position, or to a non-illustrated cutting position. The rotary shaft 15 is hand-crank driven by hand crank 20 since with a plastic lens solely a single revolution is required, and the manual turning permits more precise care in the cutting by variable speed of turning and/or hesitating as might be desired by the operator for best results with a particular plastic lens. The rotary motion of handle 20 turns shaft 21 which in turn turns therewith the mounted bevel gear 22 and the meshing bevel gear 23 mounted on shaft 24 which turns the mounted bevel gear 25 and its meshing bevel gear 26 mounted on shaft 15. The downward pivoting motion of the pivotable arm 17 is limited by the pattern 18 resting on the roller 27 mounted on a variable-height roller support shaft 28. The height is variably controlled and settable by clockwise and counterclockwise revolving of the handle 29.

The cutting-tool element is vise-clampable between mounting structures 31a and 31b. The structure 31b is fixedly attached to the shaft 32 which is mounted rotatably within cylindrical male-threaded member 33 which is threadingly receivable in female-threaded support member 34 and axially adjustable of shaft 32 by clockwise and counter-clockwise movements of the handle 35.

A conventional variable speed motor is contained in a housing having an external control lever 37 on the side of said housing for regulating the speed of said motor. The motor rotates the vise-clampable mounting structure 31a, operates the blower 38 and the vacuum-suction device 39.

Figure 2:
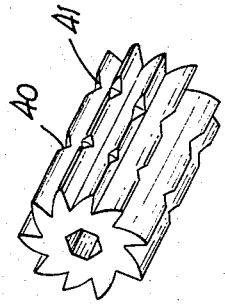
FIG. 2 illustrates a preferred multi-positioned cutter of the present invention, in perspective view.

FIG. 2 illustrates a typical stainless steel cutter having two cutting positions 40 and 41.

Figure 3:
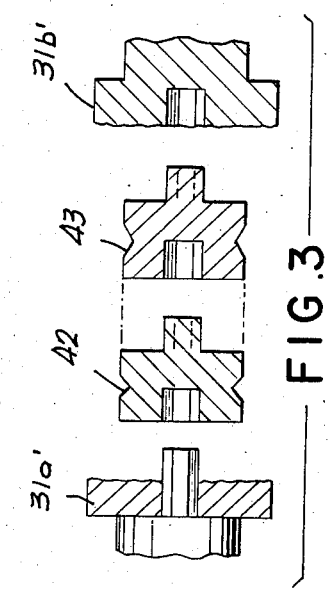
FIG. 3 illustrates a still further preferred embodiment in which the separate cutter positions are separate matable cutting elements, shown in cross-sectional side view.

FIG. 3 illustrates in cross-section separate cutter elements having axially extending male projections and female cavities whereby the inserts are matable with one-another to thereby gain multiple cutting positions 42 and 43. Mounted between mounting structures 31a' and 31b'.

Figure 4:
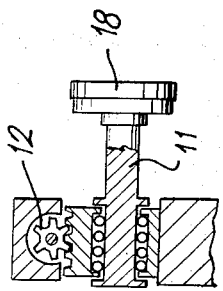
FIG. 4 illustrates a view as taken along lines 4—4 of FIG. 1, the view being an in-part view illustration.

FIG. 4, taken along lines 4—4 of FIG. 1, illustrates how the shaft 15 is mounted in bearings 44 within cylindrical male-threaded member within female-threaded pivotable arm structure 17a.

It is within the scope of the present invention to make such variations and modifications and substitition of equivalents as would be apparent to a person of ordinary skill in this particular art.

I claim:

1. A plastic lens cutting device comprising in combination; a base, elongated lens cutting means supported on said base for rotation about its axis, arm support structure mounted on said base, an arm and pivot means for pivotally mounting said arm on said arm support structure, said arm having shaft mounting means at the free end thereof for supporting a first shaft parallel to said cutting means axis, said shaft mounting means including an internally threaded cylindrical opening and an externally threaded cylindrical element threadingly received therein, said first shaft being supported within a bore of said cylindrical element for rotation relative thereto and axial movement therewith, lens pattern means secured to one end of said first shaft and first lens gripping means secured to the other end thereof, second lens gripping means supported on said arm in axial alignment with said first shaft and being adjustable along said axial alignment, whereby a lens can be gripped between said first and second gripping means when moved relatively toward each other, means for supporting an elongate follower parallel to said first shaft and for vertically adjusting said follower relative to said base, whereby said follower can be adjusted to a predetermined height to cooperate with said lens pattern means when said arm is pivoted to a cutting position, and said cutter means being located on said base to engage and cut the lens when said arm and said lens pattern are pivoted toward said follower.

2. A plastic lens cutting device of claim 1 including a second shaft and crank means secured thereto for rotating same, said second shaft is mounted concentrically to said pivot means, and gear means for transmitting rotary motion from said second shaft to said first shaft for rotating same.

3. A plastic lens cutting device of claim 2 including two vertical supports mounted on said base and having means for rotatably supporting said lens cutting means therebetween, said last mentioned means including threaded means being adjustable in the direction of said cutter means axis on at least one of said vertical supports for clamping the lens cutting means between said vertical supports.

4. A plastic lens cutting device of claim 3, in which said arm support structure is slidably mounted on said base for movement in a direction parallel to said cutter means axis, and means to selectively position said arm support structure when moved along said base.

5. A plastic lens cutting device of claim 4 wherein said second lens gripping means supported on said arm includes a second shaft mounting means for rotatably supporting a third shaft in axial alignment with said first shaft, means at one end of said third shaft for engaging the lens and means associated with the other end of said third shaft for adjustably positioning said third shaft along the axial alignment with said first shaft.

6. A plastic-lens cutting device of claim 5, including means for blowing the material cut from the lens in a direction toward vacuum-suction means for catching said cut material.

7. A plastic-lens cutting device of claim 1, including means for blowing the material cut from the lens in a direction toward vacuum-suction means for catching said cut material.

8. A plastic-lens cutting device of claim 7, including a transparent shield mounted on said base and positioned in front of said lens cutting means.

9. A plastic-lens cutting device of claim 6, including a transparent shield mounted on said base and positioned in front of said lens cutting means.

10. A plastic-lens cutting device of claim 9, in which said gear means on said second shaft includes a bevel gear mounted on said second shaft, a bevel-gear shaft mounted rotatably on said arm along an axis transverse to and extending between said second shaft and said first shaft and bevel gears mounted on each end of the bevel-gear shaft, a bevel gear mounted on said first shaft, with one of the bevel gears of said bevel-gear shaft operatively engaging the first shaft bevel gear and the other bevel gear of said bevel-gear shaft operatively engaging the second shaft bevel gear.

11. A plastic-lens cutting device of claim 2, in which said second shaft includes a bevel gear mounted on said second shaft, a bevel-gear shaft mounted rotatably on said arm along an axis transverse to and extending between said second shaft and said first shaft and bevel gears mounted on each end of the bevel-gear shaft, a bevel gear mounted on said first shaft, with one of the bevel gears of said bevel-gear shaft operatively engaging the first shaft bevel gear and the other bevel gear of said bevel-gear shaft operatively engaging the second shaft bevel gear.

12. A plastic-lens cutting device of claim 3, in which said elongaged cutting means includes a structure having a plurality of separate axially-spaced cutting members.

13. A plastic-lens cutting device of claim 1, in which said elongated cutting means includes cutter structure comprising a plurality of separate mated cutting members.

14. A plastic-lens grinding device of claim 1, in which said lens cutting means comprises metallic cutter members.

15. A plastic-lens cutting device of claim 1, including a motor connected to said cutting means for rotating same.

16. A plastic-lens cutting device of claim 15, including control means for regulating speed of rotation of said motor.

17. A plastic-lens cutting device of claim 1, including spring means attached to said pivotable arm for alternately biasing the pivotable arm in a cutting position and in an open lens-mounting position.

18. A plastic-lens cutting device of claim 10, in which there is included a transparent shield arched over the front of said cutting means.

19. A plastic-lens cutting device of claim 1, in which there is included a transparent shield arched over the front of said cutting means.

* * * * *